United States Patent
Blomberg et al.

(10) Patent No.: US 8,550,225 B2
(45) Date of Patent: Oct. 8, 2013

(54) ENERGY ABSORBER

(75) Inventors: John P. Blomberg, Red Wing, MN (US); Scott C. Casebolt, St. Paul Park, MN (US)

(73) Assignee: D B Industries, LLC, Red Wing, MN (US)

( * ) Notice: Subject to any disclaimer, the term of this patent is extended or adjusted under 35 U.S.C. 154(b) by 261 days.

(21) Appl. No.: 12/870,917

(22) Filed: Aug. 30, 2010

(65) Prior Publication Data
US 2011/0094839 A1    Apr. 28, 2011

Related U.S. Application Data

(60) Provisional application No. 61/254,541, filed on Oct. 23, 2009, provisional application No. 61/286,126, filed on Dec. 14, 2009.

(51) Int. Cl.
*A62B 35/04*    (2006.01)

(52) U.S. Cl.
USPC .......................................... 188/371; 188/65.2

(58) Field of Classification Search
CPC ........... A62B 1/06; A62B 35/04; A62B 35/75
USPC .............. 188/371, 374, 65.1, 65.2; 267/165, 267/181; 403/2; 182/3
See application file for complete search history.

(56) References Cited

U.S. PATENT DOCUMENTS

| | | |
|---|---|---|
| 4,791,243 A | 12/1988 | Ibanez et al. |
| 5,224,427 A | 7/1993 | Riches et al. |
| 5,860,493 A | 1/1999 | Cherpitel |
| 6,279,680 B1 | 8/2001 | Casebolt |
| 6,457,556 B1 | 10/2002 | Skade et al. |
| 6,725,969 B1 | 4/2004 | Meister |
| 6,918,464 B2 | 7/2005 | Renton et al. |

(Continued)

FOREIGN PATENT DOCUMENTS

| | | |
|---|---|---|
| CA | 2 698 433 | 3/2009 |
| DE | 28 10 928 | 9/1979 |

(Continued)

OTHER PUBLICATIONS

SE 70, Operation & Maintenance instructions for the Söll Vi-Go type safe climbing system with guided type fall arrester, (Miller by Sperian) Sep. 10, 2008 [online], [retrieved on May 7, 2009] Retrieved from the Vi-Go—Vertical Arrest System webpage <http://www.steigschutz.de/xist4c/web/Vi-Go_id_14703_.htm>.

(Continued)

*Primary Examiner* — Anna Momper
(74) *Attorney, Agent, or Firm* — IPLM Group, P.A.

(57) ABSTRACT

An energy absorber comprises an intermediate portion interconnecting a first end and a second end. The intermediate portion and the first and second ends are on the same plane. The intermediate portion includes curved portions configured and arranged to deform and begin to straighten when subjected to a pre-determined load to absorb energy from the pre-determined load. Should a user fall, the energy absorber will deform (begin to straighten) to absorb energy from the fall. Optional pins prevent material from getting caught in the energy absorber, assist in stiffening the energy absorber, and assist in pre-stressing the energy absorber so that it will not open up when subjected to a load less than the pre-determined load. Optional tabs and slots or protrusions and notches prevent material from getting caught in the energy absorber.

15 Claims, 13 Drawing Sheets

(56) References Cited

U.S. PATENT DOCUMENTS

| | | |
|---|---|---|
| 7,188,704 B2 | 3/2007 | Renton et al. |
| 7,708,116 B2 | 5/2010 | Martin et al. |
| 2002/0175025 A1 | 11/2002 | Kurtgis |
| 2007/0119653 A1 | 5/2007 | Brown et al. |
| 2009/0133977 A1 | 5/2009 | Warren |
| 2009/0194366 A1 | 8/2009 | Parker et al. |

FOREIGN PATENT DOCUMENTS

| | | |
|---|---|---|
| DE | 86 06 240 U1 | 6/1986 |
| DE | 35 31 391 A1 | 3/1987 |
| DE | 202 17 045 U1 | 5/2003 |
| DE | 20 2005 011 338 U1 | 12/2006 |
| EP | 0 168 021 | 1/1986 |
| FR | 2 539 477 | 7/1984 |
| FR | 2 555 060 | 5/1985 |
| FR | 2 857 601 | 1/2005 |
| GB | 1 536 354 | 12/1978 |
| GB | 2 396 195 B | 6/2004 |
| GB | 2 426 563 | 11/2006 |
| WO | WO 96/23951 | 8/1996 |
| WO | WO 00/60209 | 10/2000 |
| WO | WO 2005/058422 A1 | 6/2005 |
| WO | WO 2008/046446 A1 | 4/2008 |
| WO | WO 2009/100315 A2 | 8/2009 |

OTHER PUBLICATIONS

International Search Report for PCT/US2010/047097 mailed Dec. 2, 2010.

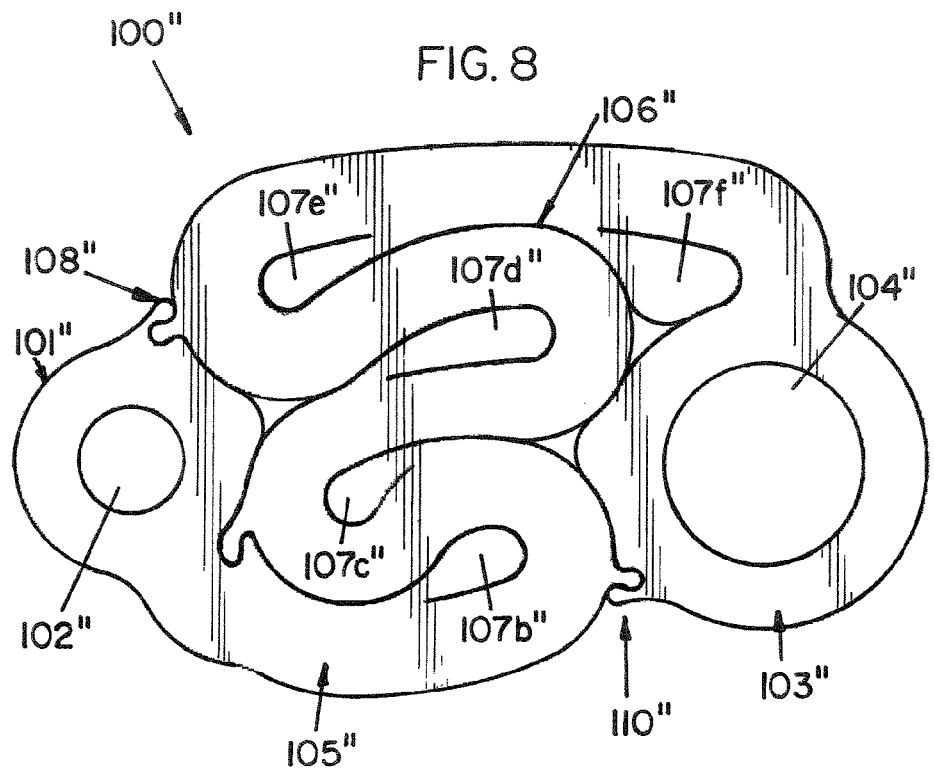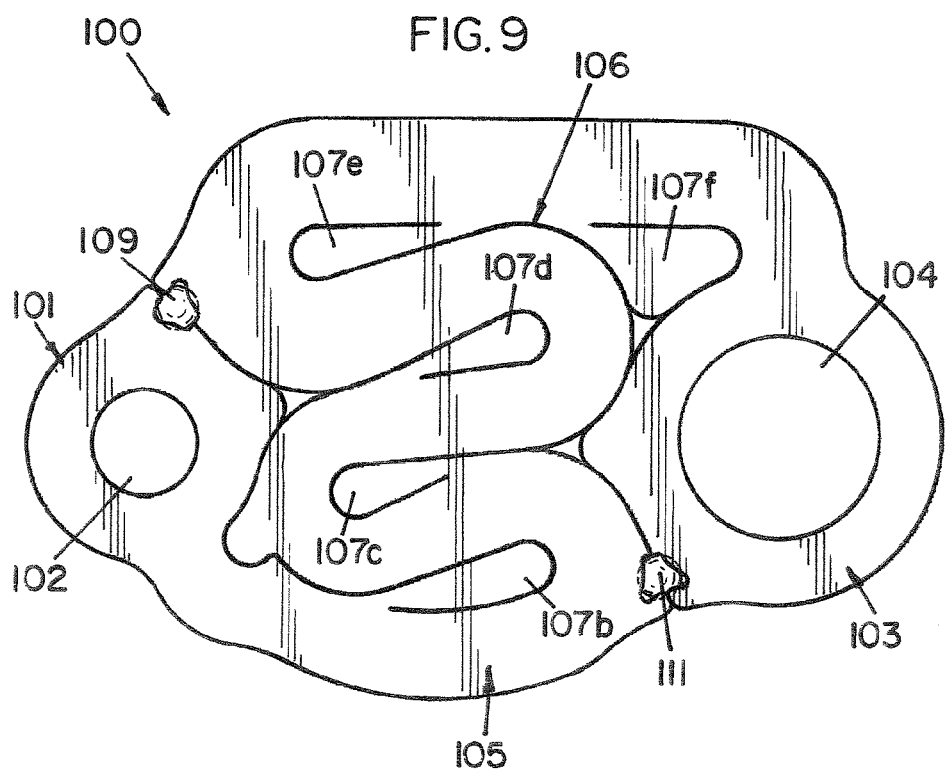

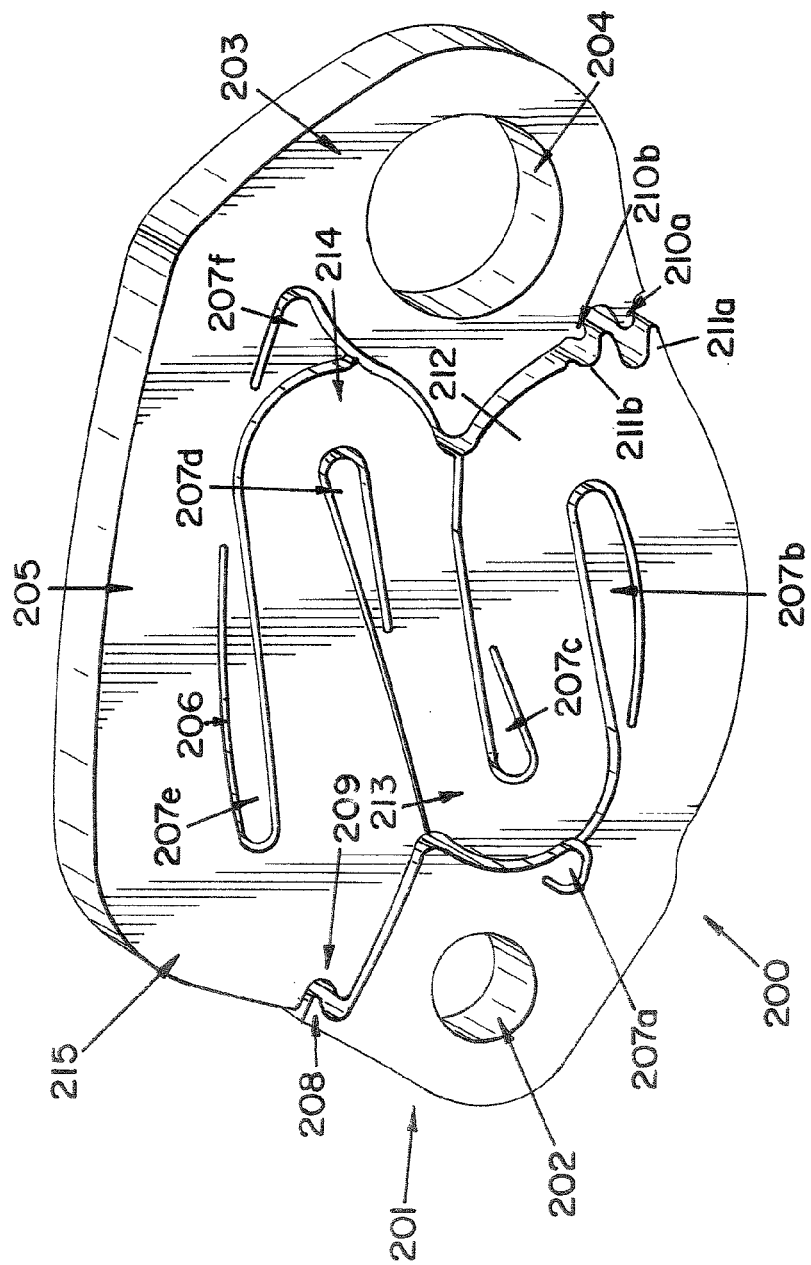

ENERGY ABSORBER

This application claims the benefit of U.S. Provisional Patent Application 61/254,541, filed Oct. 23, 2009, and U.S. Provisional Patent Application 61/286,126, filed Dec. 14, 2009.

FIELD OF THE INVENTION

The present invention relates to an energy absorber for use with fall protection and fall arrest equipment.

BACKGROUND

Various occupations place people in precarious positions at relatively dangerous heights thereby creating a need for fall protection and fall arrest apparatus. As a result, many types of safety apparatus have been developed to reduce the likelihood of a fall and/or injuries associated with a fall. Among other things, such apparatus typically include an interconnection between at least one anchorage point and a safety harness worn by a user performing tasks in proximity to the at least one anchorage point. One type of interconnection commonly used is a lifeline or a rail assembly interconnected between at least two anchorage points, along the length of which the user may move and perform tasks. The user's safety harness is typically connected to the lifeline or the rail assembly via a lanyard and a connector or other suitable devices. Should a fall occur, an energy absorber may also be used to absorb a significant amount of energy and reduce the likelihood of injury to the user due to the force of the fall.

For the reasons stated above and for other reasons stated below, which will become apparent to those skilled in the art upon reading and understanding the present specification, there is a need in the art for an energy absorber for use with fall protection and fall arrest equipment.

SUMMARY

The above-mentioned problems associated with prior devices are addressed by embodiments of the present invention and will be understood by reading and understanding the present specification. The following summary is made by way of example and not by way of limitation. It is merely provided to aid the reader in understanding some of the aspects of the invention.

In one embodiment, an energy absorber comprises an intermediate portion interconnecting a first end and a second end. The intermediate portion and the first and second ends are on the same plane. The intermediate portion includes curved portions configured and arranged to deform and begin to straighten when subjected to a pre-determined load to absorb energy from the pre-determined load.

In one embodiment, an energy absorber comprises an intermediate portion interconnecting a first end and a second end. The intermediate portion and the first and second ends are on the same plane. The intermediate portion includes curved portions configured and arranged to deform and begin to straighten when subjected to a pre-determined load to absorb energy from the pre-determined load. At least one first protrusion and at least one first notch are in opposing portions of the first end and the intermediate portion, and at least one second protrusion and at least one second notch are in opposing portions of the second end and the intermediate portion. The first and second notches are configured and arranged to receive the respective first and second protrusions to prevent material from getting caught in the energy absorber.

In one embodiment, a method of making an energy absorber comprises obtaining a piece of stainless steel having a thickness of 0.250 to 0.500 inch and cutting the stainless steel to form an intermediate portion interconnecting a first end and a second end on the same plane. The intermediate portion includes curved portions and the first and second ends include apertures formed therein. The curved portions deform and begin to straighten out when subjected to a pre-determined load to absorb energy from the pre-determined load.

BRIEF DESCRIPTION OF THE DRAWINGS

The present invention can be more easily understood, and further advantages and uses thereof can be more readily apparent, when considered in view of the detailed description and the following Figures in which:

FIG. 8 is a side view of another embodiment energy absorber constructed in accordance with the principles of the present invention;

FIG. 9 is a side view of the energy absorber shown in FIG. 1;

FIG. 11 is a side view of another embodiment energy absorber constructed in accordance with the principles of the present invention;

In accordance with common practice, the various described features are not drawn to scale but are drawn to emphasize specific features relevant to the present invention. Reference characters denote like elements throughout the Figures and the text.

DETAILED DESCRIPTION OF A PREFERRED EMBODIMENT

Figure 1:
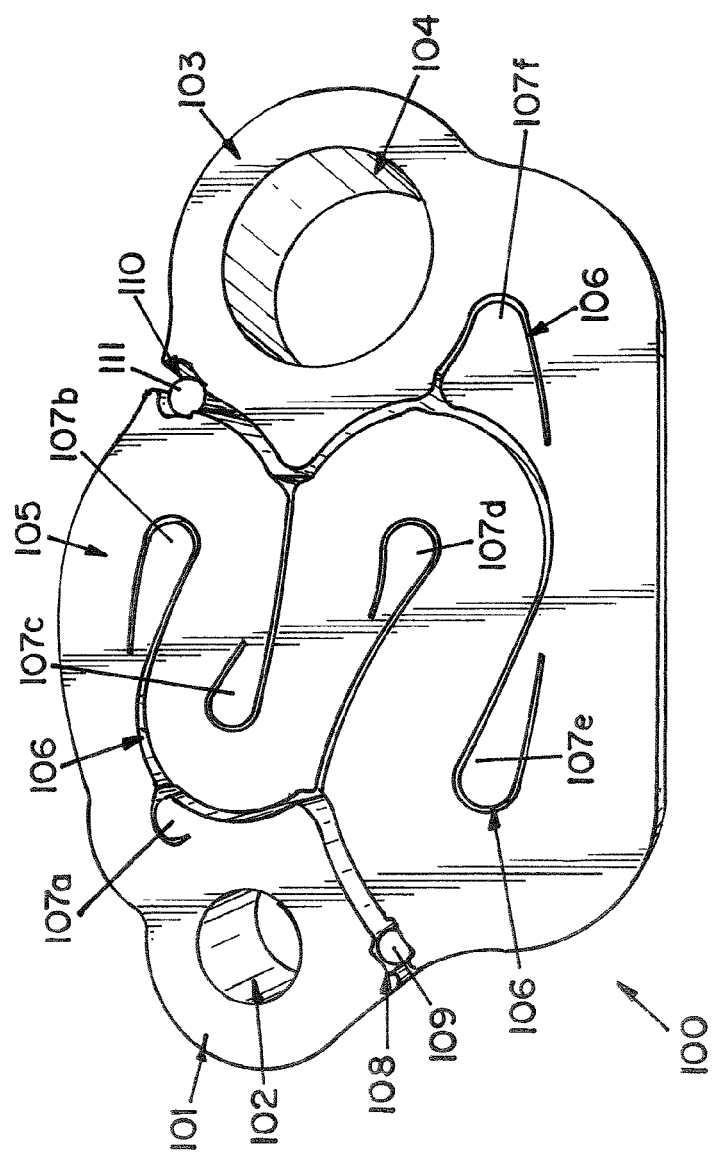
FIG. 1 is a side view of an energy absorber constructed in accordance with the principles of the present invention.
Figure 3:
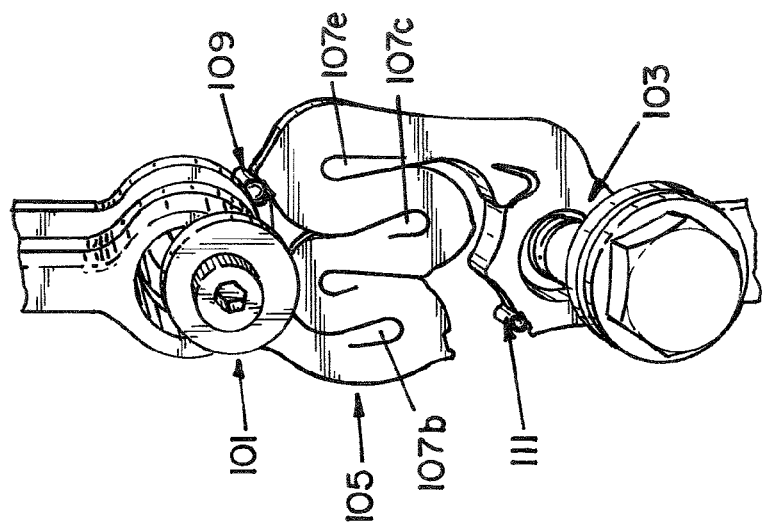
FIG. 3 is a side view of the energy absorber shown in FIG. 1 connected to anchorage structures just after elastic deformation ends and plastic deformation begins.
Figure 2:
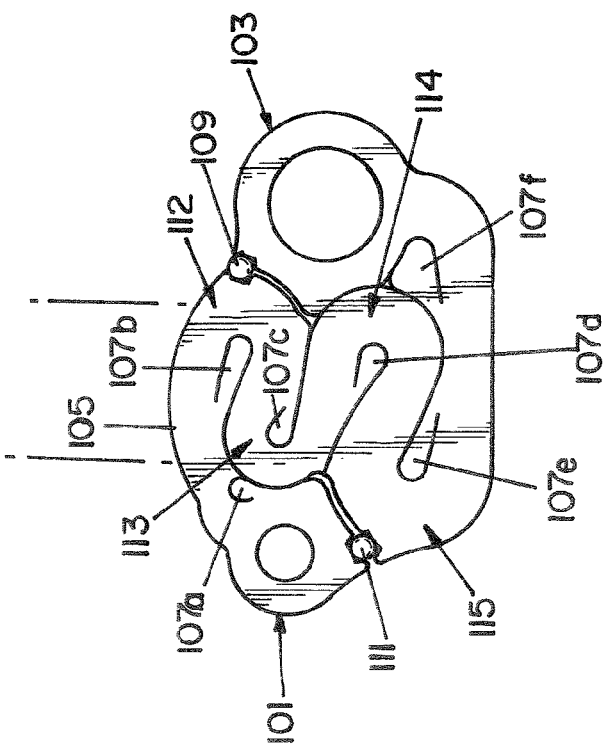
FIG. 2 is a side view of the energy absorber shown in FIG. 1 with a measuring device illustrating scale of the energy absorber and showing the energy absorber under no load.
Figure 5:
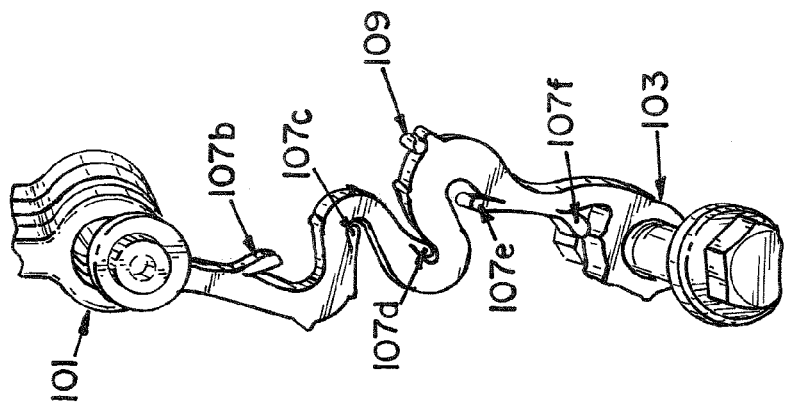
FIG. 5 is a side view of the energy absorber shown in FIG. 1 at maximum arrest force.
Figure 4:
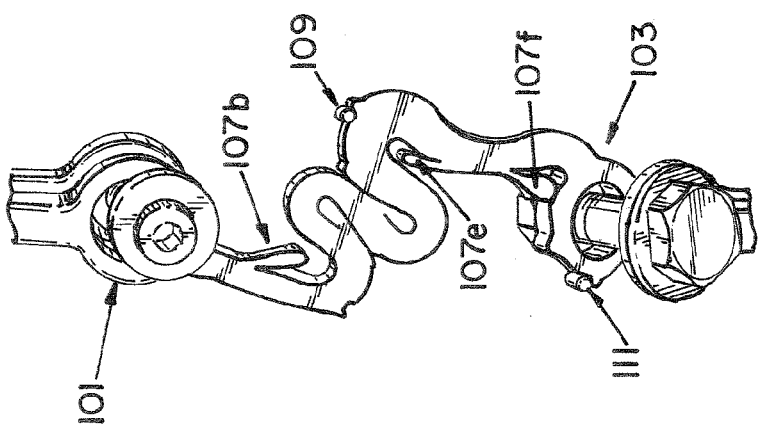
FIG. 4 is a side view of the energy absorber shown in FIG. 1 going through plastic deformation.

In the following detailed description, reference is made to the accompanying drawings, which form a part hereof, and in which is shown by way of illustration embodiments in which the inventions may be practiced. These embodiments are described in sufficient detail to enable those skilled in the art to practice the invention, and it is to be understood that other embodiments may be utilized and mechanical changes may be made without departing from the spirit and scope of the present invention. The following detailed description is, therefore, not to be taken in a limiting sense, and the scope of the present invention is defined only by the claims and equivalents thereof.

An embodiment energy absorber constructed according to the principles of the present invention is designated by the numeral 100 in the drawings. The energy absorber 100 includes a first end 101 having an aperture 102, a second end 103 having an aperture 104, and an intermediate portion 105 interconnecting the ends 101 and 103. The energy absorber 100 is preferably made from a rectangular piece of material such as annealed 300 series stainless steel having a thickness 125 of approximately 0.250 to 0.500 inch, preferably approximately 0.375 inch, and a laser cutter, a water jet, or other suitable device is used to cut the rectangular piece into the desired shape. Although annealed stainless steel is preferably used, it is recognized that other suitable materials could be used. For example, a laser cutter or water jet having a kerf of approximately 0.005 to 0.030 inches could be used to cut the rectangular piece into the desired shape. The energy absorber 100 is cut along cutting 106, which forms lobes 107a, 107b, 107c, 107d, 107e, and 107f and curves 112, 113, 114, and 115 to form curved portions in the intermediate portion 105. It is recognized that the lobes could also be cut out as voids in the material. The cutting path is shown in FIG. 9. Proximate the first end 101, a first notch 108 is formed in the first end 101 and in the intermediate portion 105, and proximate the second end 103, a second notch 110 is formed in the second end 103 and the intermediate portion 105. After the desired shape is obtained, the ends 101 and 103 are pulled away from the intermediate portion proximate the notches 108 and 110, and the pins 109 and 111 are inserted into the notches 108 and 110 and are held in place by friction. The ends 101 and 103 and the intermediate portion 105 are on the same plane.

The curves 112, 113, 114, and 115 are sized in such a way that they have roughly equivalent stresses on their inside radii during the loading in the un-deformed shaped. The inner radii of the curves are sized so that pre-mature fracture of the energy absorber does not occur at loads below the maximum desired load. Embodiments are not limited to a select number of curves as long as the curves allow for the desired characteristics of the device as set out above.

It is recognized that the geometry and the materials of the energy absorber could be scaled and determined to meet various constraints of size, non-deforming pre-load, energy absorption/arrest force, maximum static/dynamic loading conditions, and other possible variables.

The pins 109 and 111 pre-load or pre-tension the energy absorber 100 to allow the energy absorber 100 to meet several loading conditions. One loading condition is a lower limit in which the energy absorber 100 cannot permanently deform. The energy absorber 100 can act like a spring but comes back to its original shape, typically at about 2 Kilonewtons (hereinafter "kN"). Another loading condition is the energy absorber 100 should start deforming (absorbing energy and limiting force) after permanent deformation to limit the load during a fall, typically at about 6 kN. Another loading condition is the energy absorber 100 is capable of holding a large static load and a large dynamic load. The static loads are typically in the 15 kN to 5000 pounds range and the dynamic loads involve dropping a large mass, which is typically approximately 500 pounds.

The pins 109 and 111 provide several advantages. One advantage is that the pins 109 and 111 pre-load (or pre-deflect in an elastic sense) the energy absorber 100. The pre-loading is set to hold the energy absorber relatively rigid under a small load (in this example about 385 pounds), but allow it to open during a fall (high load). Another advantage is that because the energy absorber is pre-loaded, very little movement of the energy absorber takes place during the small loading, which helps keep labels or other features operatively connected to the energy absorber. If the energy absorber were not pre-loaded, the deflection could allow labels or other features to detach (shear) at the areas where there is elastic movement. Another advantage is that the pins 109 and 111 provide a barrier proximate the laser cutting so that harness or lanyard webbing or other materials cannot get caught within openings or slots in the energy absorber. The large elastic deflections that could take place without the pins could allow unwanted items into the openings or slots in the energy absorber. The pins 109 and 111 assist in preventing relatively large elastic deformation under small loadings. Another advantage is that the pins 109 and 111 could be used as an indicator that the energy absorber 100 has been subjected to a load.

The pins 109 and 111 could be made of any suitable material. Since the pins are used to provide a relatively rigid spacer in the entrance gaps of the energy absorber, any sufficient stiff material could be used. For example, the pins could be replaced by a piece of sheet metal, a hard plastic part, a rivet, a screw, a rod, a tube, or any other suitable device that could pre-load the energy absorber.

Figure 10A:
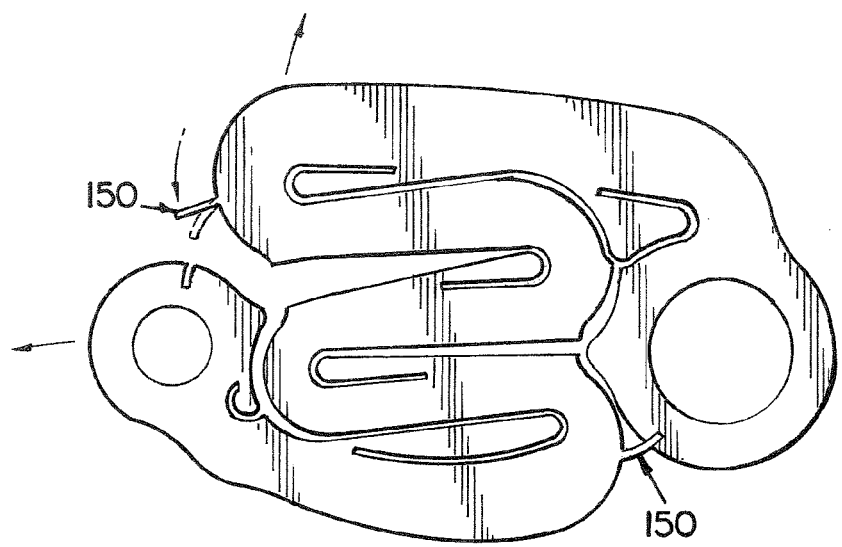
FIG. 10A is a side view of another embodiment energy absorber with tabs constructed in accordance with the principles of the present invention.
Figure 10B:
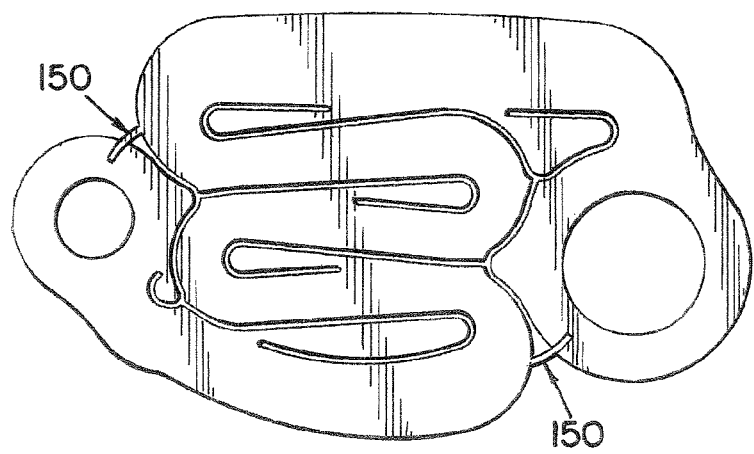
FIG. 10B is a side view the energy absorber shown in FIG. 10A.
Figure 12:
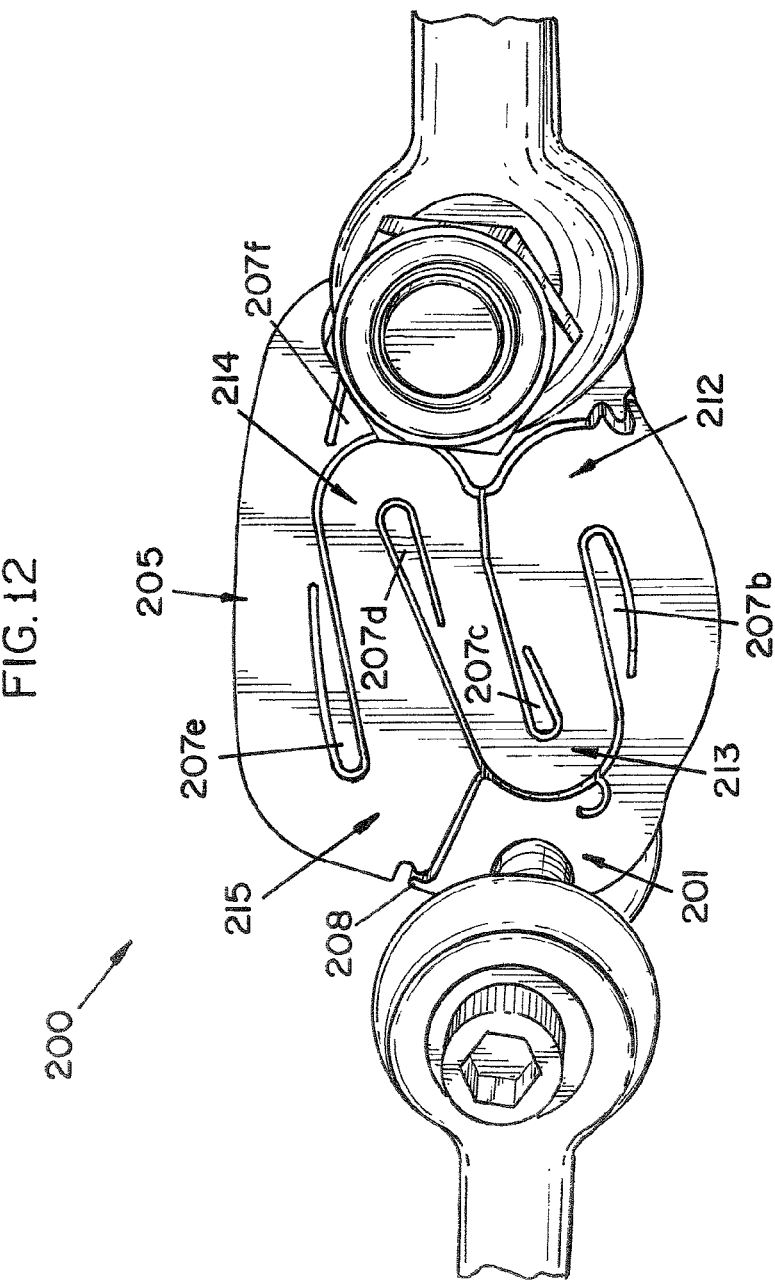
FIG. 12 is a side view of the energy absorber shown in FIG. 11 connected to anchorage structures and showing the energy absorber under no load.
Figure 13:
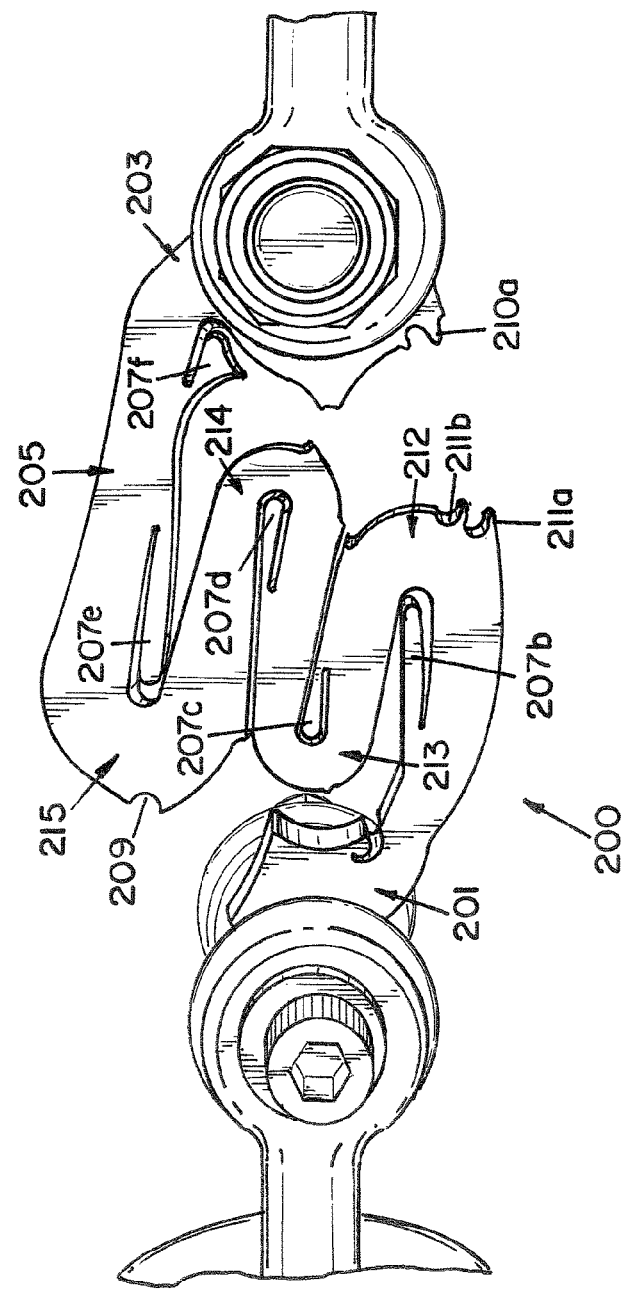
FIG. 13 is a side view of the energy absorber shown in FIG. 11 connected to anchorage structures and showing the energy absorber undergoing plastic deformation under load.
Figure 14:
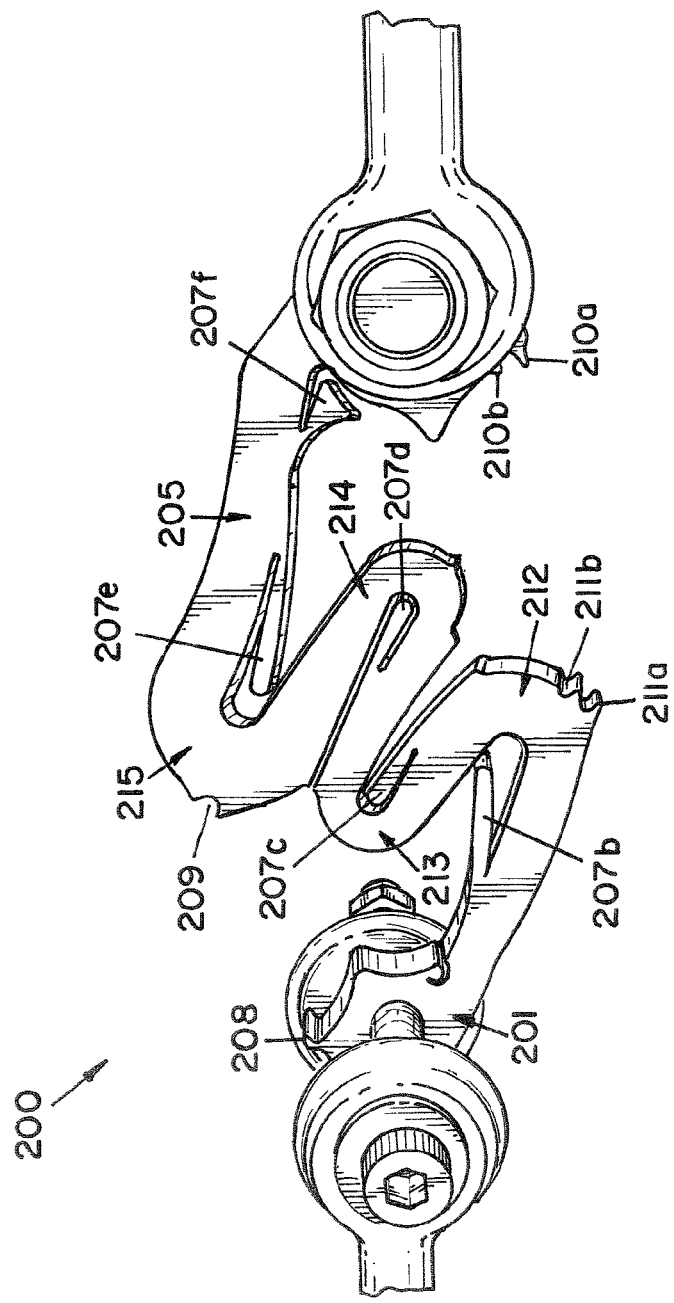
FIG. 14 is a side view of the energy absorber shown in FIG. 11 connected to anchorage structures and showing the energy absorber undergoing further plastic deformation under load.
Figure 15:
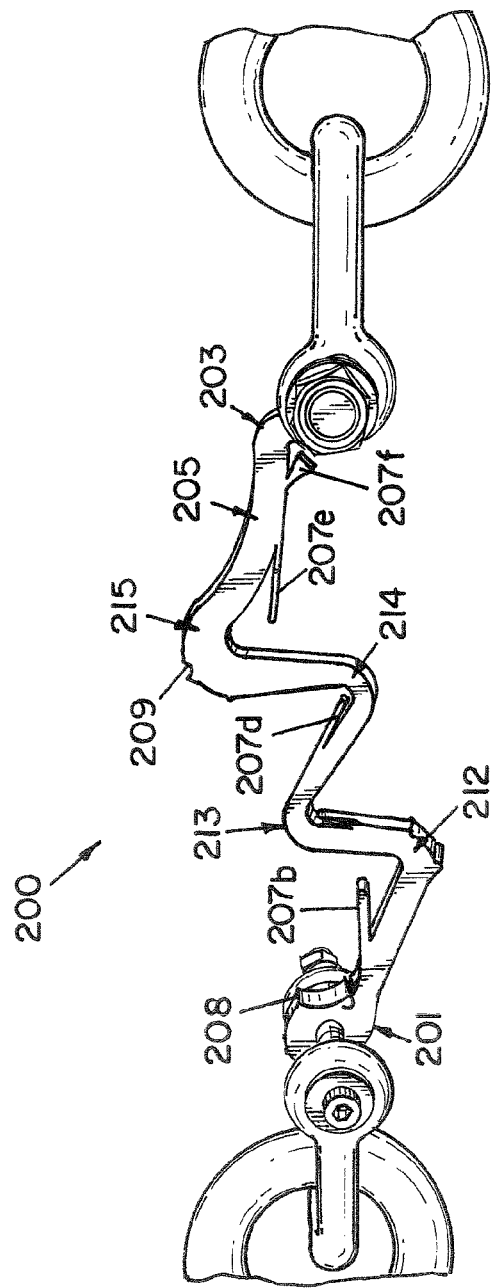
FIG. 15 is a side view of the energy absorber shown in FIG. 11 connected to anchorage structures and showing the energy absorber after being subjected to a load arrest force of approximately 6 kN.

Alternatively, in lieu of utilizing the pins 109 and 111, one or more tab 150 could be created proximate each end of the part itself, and each tab 150 could be bent into a slot in an opposing portion or otherwise bent toward an opposing portion to provide a barrier proximate the laser cutting so that harness or lanyard webbing or other materials cannot get caught within openings or slots in the energy absorber. This is illustrated in FIGS. 10A and 10B. As shown in FIG. 10A, the part would need to be elastically stretched while the tabs 150 are bent. After the part is released from being stretched, as shown in FIG. 10B, the tabs 150 would pre-load the absorber.

The energy absorber 100 is preferably manufactured using a single pass or cut of a laser cutter, a water jet, or other suitable device. This reduces processing time to manufacture the part. In order to do this, each cutting path ends in a low stress area. The highest stressed areas occur where the part bends back on itself, proximate the curves 112, 113, 114, and 115. A radius of approximately 0.060 to 0.125 inch, preferably approximately 0.080 inch, in the curved back sections ensures the part will not fail, but in the straighter sections where the stresses are lower, the cutting path may be terminated. This part has the cuts ending in low stress areas. In addition, using a single pass of the cutter also reduces the chances of harness material or other objects being caught in the energy absorber.

Figure 6:
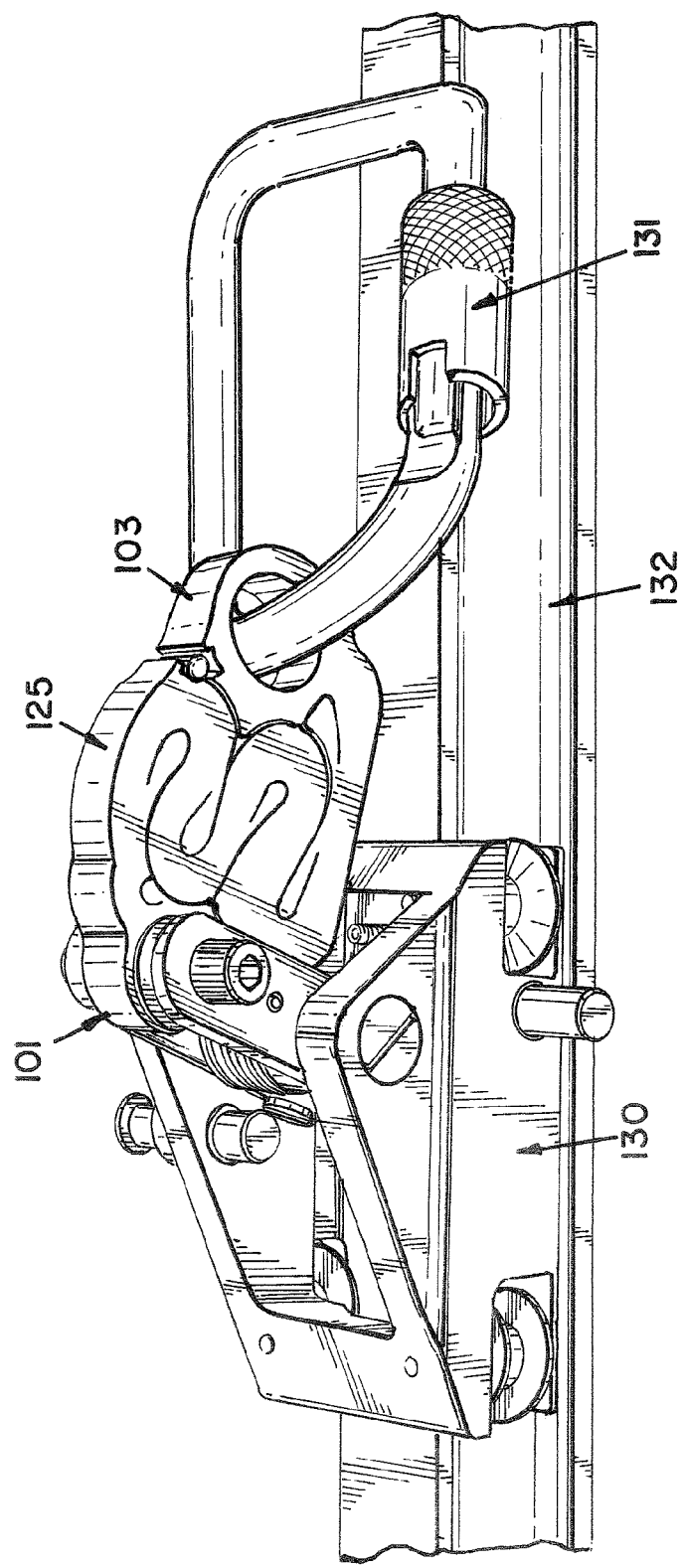
FIG. 6 is a perspective view of the energy absorber shown in FIG. 1 connected to a shuttle and a carabiner.

There are many possible uses for the energy absorber 100. An example is connecting the energy absorber 100 to a shuttle 130, which moves along a rail 132, and to a carabiner 131, which is used to connect the energy absorber 100 to the user. This is shown in FIG. 6. Other possible uses include, but are not limited to, limiting the impact force on a self-retracting lifeline ("SRL") or a rescue device.

Figure 7:
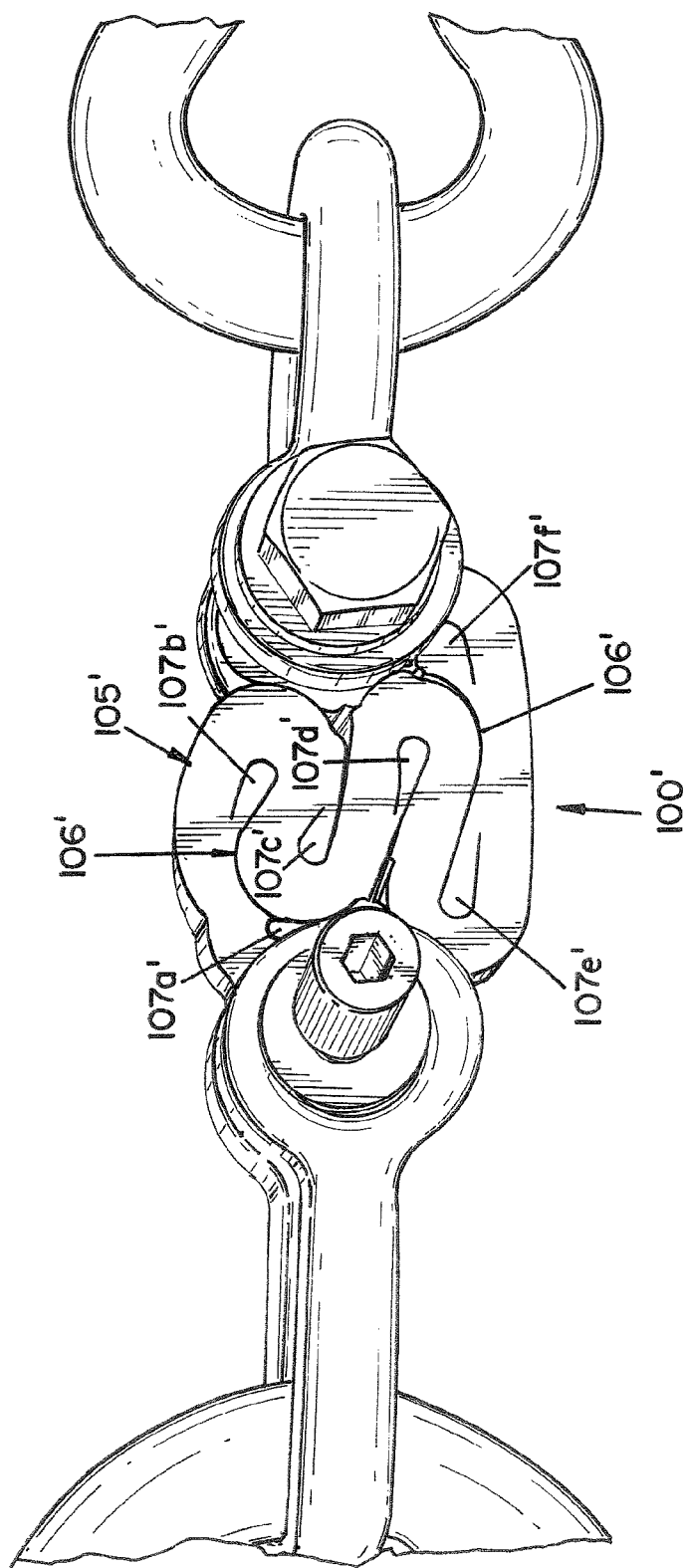
FIG. 7 is a side view of another embodiment energy absorber constructed in accordance with the principles of the present invention.

FIGS. 7 and 8 show other embodiment energy absorbers constructed in accordance with the principles of the present invention. The energy absorber 100' shown in FIG. 7 is similar to that shown in FIG. 1 but does not include the pins. The energy absorber 100" shown in FIG. 8 includes overlapping portions 108" and 110" in lieu of the pins. Thus, the pins are optional and the energy absorber could include alternative features in lieu of the pins.

In use, the energy absorber deforms when subjected to a pre-determined load. Should the user fall, the energy absorber will deform (begin to straighten out) to absorb some of the energy from the fall. The curved portions and the lobes or optional voids facilitate deformation of the intermediate portion. The lobes 107a-107f simply hang from the energy absorber as it deforms. The optional pins are held in place by friction. The pins prevent material from getting caught in the energy absorber, assist in stiffening the energy absorber, and assist in pre-stressing the energy absorber so that it will not open up when subjected to a load less than the pre-determined load. The drawings show the energy absorber as it deforms and the curved portions begin to straighten. The pins simply fall out of the notches when the energy absorber deforms.

Another embodiment energy absorber constructed according to the principles of the present invention is designated by the numeral 200 in the drawings. The energy absorber 200 includes a first end 201 having an aperture 202, a second end 203 having an aperture 204, and an intermediate portion 205 interconnecting the ends 201 and 203. The energy absorber 200 is preferably made from a rectangular piece of material such as annealed 300 series stainless steel having a thickness of approximately 0.250 to 0.500 inch, preferably approximately 0.375 inch, and a laser cutter, a water jet, or other suitable device is used to cut the rectangular piece into the desired shape. Although annealed stainless steel is preferably used, it is recognized that other suitable materials could be used. For example, a laser cutter or water jet having a kerf of approximately 0.005 to 0.030 inches could be used to cut the rectangular piece into the desired shape. The energy absorber 200 is cut along cutting 206, which forms lobes 207a, 207b, 207c, 207d, 207e, and 207f and curves 212, 213, 214, and 215 to form curved portions in the intermediate portion 205. It is recognized that the lobes could also be cut out as voids in the material. Leaving these lobes in place provides more surface area to which labels could be connected, lessens the processing time on the laser cutter or the water jet, and reduces the amount of scrap material during manufacturing. The cutting path is shown in FIG. 11. Extending outward from the first end 201 proximate the intermediate portion 205 is a protrusion 208 which is received in a notch 209 formed in the intermediate portion 205. Extending outward from the second end 203 proximate the intermediate portion 205 are protrusions 210a and 210b which are received in notches 211a and 211b, respectively, formed in the intermediate portion 205. The ends 201 and 203 and the intermediate portion 205 are on the same plane.

The curves 212 and 215 are preferably sized and configured in such a way that they have roughly equivalent stresses on their inside radii during the loading in the un-deformed shaped. This means they are not stronger than necessary and begin to plastically deform at approximately the same loading. The inner radii of the curves are sized and configured so that pre-mature fracture of the energy absorber does not occur at loads below the maximum desired load. Curve 213 is preferably larger than necessary to prevent plastic deformation at small loadings as it should be large enough to not prematurely fracture during large deformations. Curve 214 is forced closed during small loading. During small loading, the cut from proximate lobe 207d toward aperture 202 closes proximate aperture 202 before permanent deformation occurs. This is shown in FIG. 11. Embodiments are not limited to a select number of curves as long as the curves allow for the desired characteristics of the device as set out above.

It is recognized that the geometry and the materials of the energy absorber could be scaled and determined to meet various constraints of size, sealing or barrier gap width, spring pre-load, energy absorption/arrest force, maximum static/dynamic loading conditions, and other possible variables.

The energy absorber 200 meets several loading conditions. One loading condition is a lower limit that in which the energy absorber 200 does not permanently deform. The energy absorber 200 can act like a spring but comes back to its original shape, typically at about 2 Kilonewtons (hereinafter "kN"). Another loading condition is the energy absorber 200 should start deforming (absorbing energy and limiting force) after permanent deformation to limit the load during a fall, typically at about 6 kN. Another loading condition is the energy absorber 200 is capable of holding a large static load and a large dynamic load. The static loads are typically in the 15 kN to 5000 pounds range and the dynamic loads involve dropping a large mass, which is typically approximately 500 pounds.

The energy absorber 200 acts like a spring during small loads. Consequently, the laser cutter or water jet gaps that form the absorbing elements will open up during a small load and close very close to their original width after unloading. Since a significant gap can form during the small load, a sealing or barrier mechanism is preferably used to prevent harness or lanyard webbing or other materials from getting caught within the openings or slots in the energy absorber. One possible design is to use a labyrinth type of seal or barrier, although other types of sealing or barriers could be envisioned.

The energy absorber 200 is preferably manufactured using a single pass or cut of a laser cutter, a water jet, or other suitable device. This reduces processing time to manufacture the part. In order to do this, each cutting path ends in a low stress area. The highest stressed areas occur where the part bends back on itself, proximate the curves 212, 213, 214, and 215. A radius of approximately 0.060 to 0.125 inch, preferably approximately 0.080 inch, in the curved back sections ensures the part will not fail, but in the straighter sections where the stresses are lower, the cutting path may be terminated. This part has the cuts ending in low stress areas. In addition, using a single pass of the cutter also reduces the chances of harness material or other objects being caught in the energy absorber.

In use, the protrusions 208, 210a, and 210b prevent material from getting caught in the energy absorber. The energy absorber deforms when subjected to a pre-determined load. Should the user fall, the energy absorber will deform (begin to straighten out) to absorb some of the energy from the fall. The drawings show the energy absorber as it deforms and the curved portions begin to straighten. The protrusions 208, 210a, and 210b do not deform or deflect during deformation of the energy absorber. The protrusions 208, 210a, and 210b simply move out of the notches 209, 211a, and 211b as the ends 201 and 203 are pulled apart. The curved portions and the lobes or optional voids facilitate deformation of the intermediate portion. The lobes 207a-207f simply hang from the energy absorber as it deforms.

Figure 16:
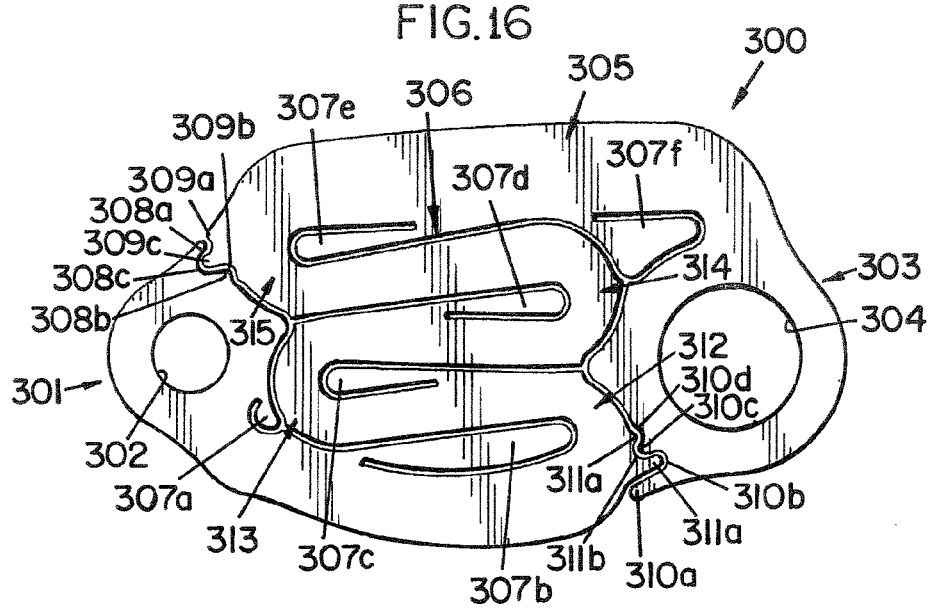
FIG. 16 is a side view of another embodiment energy absorber constructed in accordance with the principles of the present invention.

Another embodiment energy absorber constructed according to the principles of the present invention is designated by the numeral 300 and is shown in FIG. 16. The energy absorber 300 includes a first end 301 having an aperture 302, a second end 303 having an aperture 304, and an intermediate portion 305 interconnecting the ends 301 and 303. The energy absorber 300 is preferably made from a rectangular piece of material such as annealed 300 series stainless steel having a thickness of approximately 0.250 to 0.500 inch, preferably approximately 0.375 inch, and a laser cutter, a water jet, or other suitable device is used to cut the rectangular piece into the desired shape. Although annealed stainless steel is preferably used, it is recognized that other suitable materials could be used. For example, a laser cutter or water jet having a kerf of approximately 0.005 to 0.030 inches could be used to cut the rectangular piece into the desired shape. The energy absorber 300 is cut along cutting 306, which forms lobes 307a, 307b, 307c, 307d, 307e, and 307f and curves 312, 313, 314, and 315 to form curved portions in the intermediate portion 305. It is recognized that the lobes could also be cut out as voids in the material. Leaving these lobes in place provides more surface area to which labels could be connected, lessens the processing time on the laser cutter or the water jet, and reduces the amount of scrap material during manufacturing. The ends 301 and 303 and the intermediate portion 305 are on the same plane.

Extending outward from the first end 301 proximate the intermediate portion 305 are protrusions 308a and 308b and a notch 308c is positioned between the protrusions 308a and 308b. Extending outward from the intermediate portion 305 proximate the first end 301 is a protrusion 309c and notches 309a and 309b are positioned on opposing sides of the protrusion 309c. The protrusion 308a extends into the notch 309a, the protrusion 309c extends into the notch 308c, and the protrusion 308b extends into the notch 309b. Extending outward from the second end 303 proximate the intermediate portion 305 are protrusions 310a and 310c. A notch 310b is positioned between the protrusions 310a and 310c and a notch 310d is positioned on the other side of the protrusion 310c. Extending outward from the intermediate portion 305 proximate the second end 303 are protrusions 311a and 311c and a notch 311b is positioned between the protrusions 311a and 311c. Protrusion 310a is positioned on one side of the protrusion 311a, which extends into the notch 310b. Protrusion 310c extends into notch 311b, and protrusion 311c extends into notch 310d. The protrusions and notches assist in preventing harness or lanyard webbing or other materials from getting caught within the openings or slots in the energy absorber.

The curves 312 and 315 are preferably sized and configured in such a way that they have roughly equivalent stresses on their inside radii during the loading in the un-deformed shaped. This means they are not stronger than necessary and begin to plastically deform at approximately the same loading. The inner radii of the curves are sized and configured so that pre-mature fracture of the energy absorber does not occur at loads below the maximum desired load. Curve 313 is preferably larger than necessary to prevent plastic deformation at small loadings as it should be large enough to not prematurely fracture during large deformations. Curve 314 is forced closed during small loading. During small loading, the cut from proximate lobe 307d toward aperture 302 closes proximate aperture 302 before permanent deformation occurs. Embodiments are not limited to a select number of curves as long as the curves allow for the desired characteristics of the device as set out above.

It is recognized that the geometry and the materials of the energy absorber could be scaled and determined to meet various constraints of size, sealing or barrier gap width, spring pre-load, energy absorption/arrest force, maximum static/dynamic loading conditions, and other possible variables.

The energy absorber 300 meets several loading conditions. One loading condition is a lower limit that in which the energy absorber 300 does not permanently deform. The energy absorber 300 can act like a spring but comes back to its original shape, typically at about 2 Kilonewtons (hereinafter "kN"). Another loading condition is the energy absorber 300 should start deforming (absorbing energy and limiting force) after permanent deformation to limit the load during a fall, typically at about 6 kN. Another loading condition is the energy absorber 300 is capable of holding a large static load and a large dynamic load. The static loads are typically in the 15 kN to 5000 pounds range and the dynamic loads involve dropping a large mass, which is typically approximately 500 pounds.

The energy absorber 300 acts like a spring during small loads. Consequently, the laser cutter or water jet gaps that form the absorbing elements will open up during a small load and close very close to their original width after unloading. Since a significant gap can form during the small load, a sealing or barrier mechanism is preferably used to prevent harness or lanyard webbing or other materials from getting caught within the openings or slots in the energy absorber. One possible design is to use a labyrinth type of seal or barrier, although other types of sealing or barriers could be envisioned.

The energy absorber 300 is preferably manufactured using a single pass or cut of a laser cutter, a water jet, or other suitable device. This reduces processing time to manufacture the part. In order to do this, each cutting path ends in a low stress area. The highest stressed areas occur where the part bends back on itself, proximate the curves 312, 313, 314, and 315. A radius of approximately 0.060 to 0.125 inch, preferably approximately 0.080 inch, in the curved back sections ensures the part will not fail, but in the straighter sections where the stresses are lower, the cutting path may be terminated. This part has the cuts ending in low stress areas. In addition, using a single pass of the cutter also reduces the chances of harness material or other objects being caught in the energy absorber.

In use, the protrusions and notches prevent material from getting caught in the energy absorber. The energy absorber deforms when subjected to a pre-determined load. Should the user fall, the energy absorber will deform (begin to straighten out) to absorb some of the energy from the fall. The energy absorber 300 deforms similar to the energy absorber 200. The protrusions do not deform or deflect during deformation of the energy absorber 300 but rather simply move out of the notches as the ends 301 and 303 are pulled apart. The curved portions and the lobes or optional voids facilitate deformation of the intermediate portion. The lobes 307a-307f simply hang from the energy absorber as it deforms.

Alternatively, the labyrinth seals or barriers could be replaced with any suitable highly elastic material. For example, a rubber strip or a relatively thin metal strip bent into a spring-like shape could be used to plug any gaps where webbing or other materials could get caught.

Figure 17:
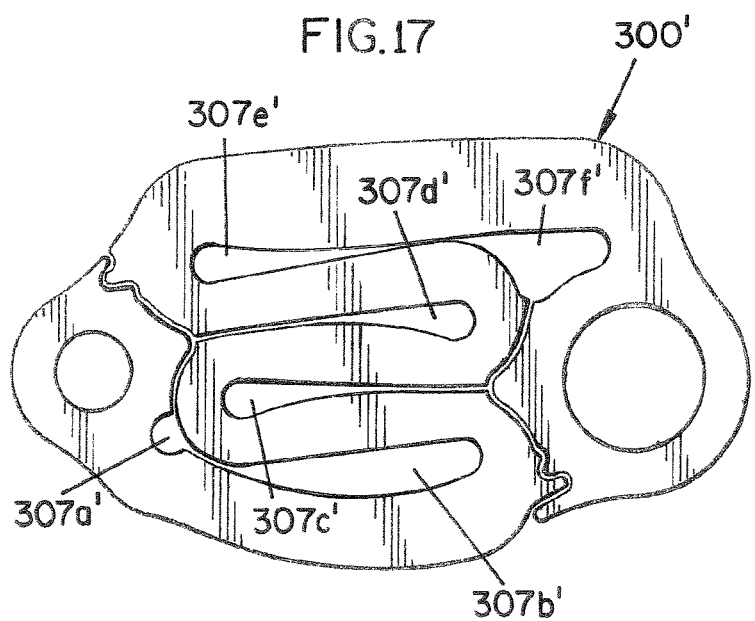
FIG. 17 is a side view of another embodiment energy absorber constructed in accordance with the principles of the present invention.

Another embodiment energy absorber constructed according to the principles of the present invention is designated by the numeral 300' and is shown in FIG. 17. The energy absorber 300' is similar to the energy absorber 300 and, therefore, only the significant differences will be described. The energy absorber 300' includes voids 307a', 307b', 307c', 307d', 307e', and 307f' in lieu of lobes to facilitate deformation of the intermediate portion.

It is recognized for any of the embodiments that the material, thickness, radii, dimensions, and other features could vary depending upon the application, desired arresting force, and other variables. For example, the thickness could change to reduce or increase the arresting force, and for example, a larger or smaller radii could be used but radii that are too small could cause larger stress concentrations and the part could fail.

The above specification, examples, and data provide a complete description of the manufacture and use of the composition of embodiments of the invention. Since many embodiments of the invention can be made without departing from the spirit and scope of the invention, the invention resides in the claims hereinafter appended.

We claim:

1. An energy absorber, comprising:
   an intermediate portion interconnecting a first end and a second end, the intermediate portion and the first and second ends being on the same plane, the intermediate portion including curved portions configured and arranged to deform and begin to straighten when subjected to a pre-determined load to absorb energy from the pre-determined load;
   at least one first protrusion and at least one first notch in opposing portions of the first end and the intermediate portion;
   at least one second protrusion and at least one second notch in opposing portions of the second end and the intermediate portion; and
   wherein the first and second notches are configured and arranged to receive the respective first and second protrusions to prevent material from getting caught in the energy absorber, and wherein the first and second protrusions move out of the respective first and second notches without deforming when subjected to the pre-determined load and the first and second ends pull apart.

2. The energy absorber of claim 1, further comprising lobes in the intermediate portion to facilitate deformation of the intermediate portion.

3. The energy absorber of claim 1, further comprising voids in the intermediate portion to facilitate deformation of the intermediate portion.

4. The energy absorber of claim 1, wherein the intermediate portion and the first and second ends are made from a piece of stainless steel having a thickness of approximately 0.250 to 0.500 inch.

5. The energy absorber of claim 1, wherein the intermediate portion begins to deform when subjected to a load of at least 6 kN.

6. The energy absorber of claim 1, wherein back sections of the curved portions have a radius of approximately 0.060 to 0.125 inch.

7. An energy absorber, comprising:
   an intermediate portion interconnecting a first end and a second end, the intermediate portion and the first and second ends being on the same plane, the intermediate portion including curved portions configured and arranged to deform and begin to straighten when subjected to a pre-determined load to absorb energy from the pre-determined load;
   at least one first protrusion and at least one first notch in opposing portions of the first end and the intermediate portion;
   at least one second protrusion and at least one second notch in opposing portions of the second end and the intermediate portion; and
   wherein the first and second notches are configured and arranged to receive the respective first and second protrusions to prevent material from getting caught in the energy absorber, wherein the first and second protrusions move out of the respective first and second notches without deforming when subjected to the predetermined load and the first and second ends pull apart, and wherein the energy absorber acts like a spring when subjected to a smaller load than the pre-determined load and returns to a substantially original shape when no longer subjected to the smaller load.

8. The energy absorber of claim 7, wherein the first end and the intermediate portion proximate the first end each includes a first protrusion and a first notch, the first protrusion of the first end corresponding with the first notch of the intermediate portion and the first protrusion of the intermediate portion corresponding with the first notch of the first end.

9. The energy absorber of claim 7, wherein the second end and the intermediate portion proximate the second end each includes a second protrusion and a second notch, the second protrusion of the second end corresponding with the second notch of the intermediate portion and the second protrusion of the intermediate portion corresponding with the second notch of the second end.

10. The energy absorber of claim 7, wherein the intermediate portion begins to deform when subjected to a load of at least 6 kN.

11. The energy absorber of claim 7, wherein back sections of the curved portions have a radius of approximately 0.060 to 0.125 inch.

12. A method of making an energy absorber, comprising:
   obtaining a piece of stainless steel having a thickness of 0.250 to 0.500 inch; and
   cutting the stainless steel to form an intermediate portion interconnecting a first end and a second end, a first protrusion and a first notch in opposing portions of the first end and the intermediate portion, and a second protrusion and a second notch in opposing portions of the second end and the intermediate portion on the same plane, the intermediate portion including curved portions and the first and second ends including apertures formed therein, the curved portions deform and begin to straighten out when subjected to a pre-determined load to absorb energy from the pre-determined load, the notches configured and arranged to receive the protrusions to prevent material from getting caught in the energy absorber, the first and second notches being configured and arranged to receive the respective first and second protrusions to prevent material from getting caught in the energy absorber, and the first and second protrusions being configured and arranged to move out of the respective first and second notches without deforming when subjected to the predetermined load and the first and second ends pull apart.

13. The method of claim 12, wherein the stainless steel has a thickness of approximately 0.375 inch.

14. The method of claim 12, wherein the stainless steel is cut using a laser cutter or a water jet.

15. The method of claim 12, further comprising forming lobes in the intermediate portion when cutting the stainless steel.

* * * * *